July 6, 1937. J. T. CURTIS 2,085,958
ELECTROLYTE FOR ELECTROLYTIC CONDENSERS AND PROCESS OF MAKING THE SAME
Filed Oct. 9, 1934
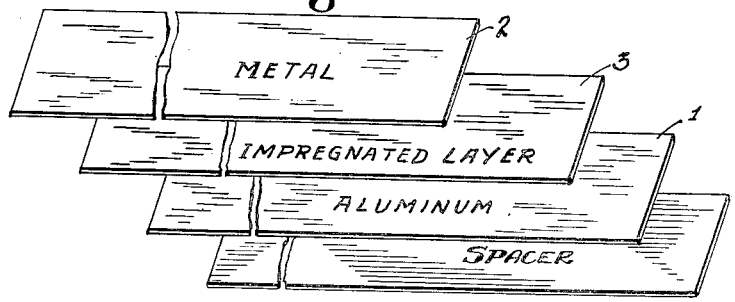
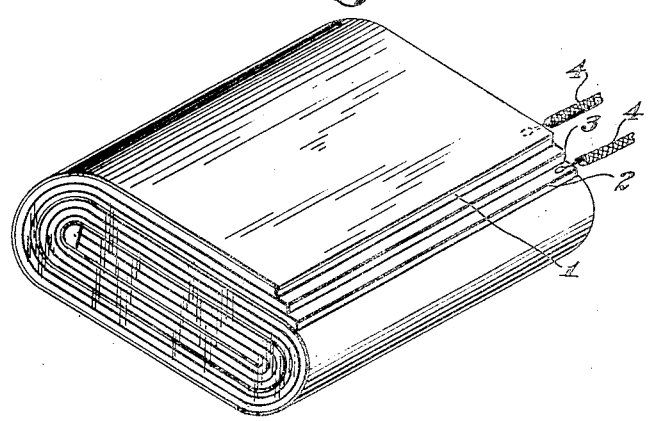
INVENTOR
JESSE T. CURTIS
BY
His ATTORNEYS.

Patented July 6, 1937

2,085,958

UNITED STATES PATENT OFFICE 2,085,958

ELECTROLYTE FOR ELECTROLYTIC CONDENSERS AND PROCESS OF MAKING THE SAME

Jesse T. Curtis, Cleveland, Ohio

Application October 9, 1934, Serial No. 747,598

10 Claims. (Cl. 175—315)

This invention is an improvement in electrolytic condensers and relates more particularly to an electrolyte and an improved method of making the same.

In the manufacture of electrolytic condensers, I have found that there are certain controlling factors which must be observed if a satisfactory condenser having predetermined characteristics and qualities is to be obtained. This is particularly true in the manufacture of electrolytic condensers designed for high voltage use, such as from 500 to 700 volts or better. Some of these factors are a properly controlled water content, the chemical composition and proportions in the electrolyte, and the method or process of forming the electrolyte.

Heretofore, electrolytes of this character have always been made, so far as I am aware, under such conditions that there was no practical way of controlling the water content so as to produce an efficient condenser for a specific purpose or having certain predetermined characteristics. Furthermore, such condensers heretofore produced with these paste electrolytes, would have but a short, useful life and it was found that they were particularly vulnerable in humid weather or when used in temperatures much above 100° F. Under these adverse conditions the electrolyte is apt to attack the plates of the condenser, especially the positive plate.

It is an object of this invention to produce an electrolyte for electrolytic condensers which will be characterized by a long useful life in the particular use for which it is designed.

Another object of the invention is to control the water content of the electrolyte, especially in condensers designed for high voltage use, and to accurately control the chemical combinations and reactions in preparing the electrolyte.

A further object resides in the hereinafter described improved method or process of making an electrolyte.

Another object is to produce a paste electrolyte, simplified in the ingredients which constitute it and producing a condenser possessed of a low power factor and low in internal resistance.

A still further object is to produce a paste electrolyte which, by virtue of the process by which it is made, can be controlled accurately to possess desirable characteristics best suited in the use to which it is designed, thereby insuring an efficient and extended useful life in use and to extend the shelf life of the condenser.

Other objects and advantages of my invention will become more apparent as the following description of an embodiment thereof progresses, reference being made to the accompanying drawing in which like reference characters are employed to designate like parts throughout the same.

In the drawing:—

Figure 1 is a distended view of the condenser plates and separator and shows their relationship one with the other.

Figure 2 is a longitudinal section through the assembled metal plates and separator and shows the mode of rolling or folding the assembly into a compact form.

Figure 3 is a perspective view of a completely rolled or folded condenser with terminals attached and ready to be packed in a paper or other convenient container for use.

In carrying out my invention, I employ plates of metal spaced apart and in contact with an electrolyte of pasty consistency and preferably of the hereinafter described composition. One of the plates is made of one of the metals, aluminum, tantalum or magnesium, aluminum being preferred, both because of its cheapness and availability and because its behavior is superior to that of other metals. The other plate may be of any one of these metals, or, for most purposes, of any other metal which does not react directly with the electrolyte.

Referring briefly to the drawing, the metal plates, 1 and 2 are spaced apart or separated by a sheet or strip of flexible material with which the electrolyte is in contact. The spacer sheet is indicated at 3. Suitable leads or terminals are provided for the metal plates as desired, such as at 4.

My invention relates particularly to an improved electrolyte for use with condensers of this type and to an improved method or process of making the same. By my invention a smooth electrolyte of pasty consistency is obtained and is possessed of many characteristics which cooperate and combine to produce a highly efficient and long lived condenser.

A very desirable electrolyte comprising ammonium carbonate, boracic acid and a higher alcohol such as ethylene glycol is disclosed in my Patent No. 1,950,352 granted March 6, 1934, but I have found the electrolyte produced in accordance with the present invention is even more desirable and condensers employing it have certain characteristics or qualities not heretofore possessed by other condensers as will more fully appear hereinafter.

In carrying out my invention I have found that a high voltage electrolyte consisting of bicarbonate of ammonia, boric acid and a solvent is a decided improvement in the art, and that in such electrolytes the use of borax or vegetable acid is dispensed with.

While I prefer to employ only the above ingredients in the proportions hereinafter described, it is to be understood that I may replace part of the ammonium bicarbonate with ammonium carbonate. This will produce a good electrolyte but, as I have stated before, the use of ammonium bicarbonate, boric acid and a solvent will produce the best results. Furthermore, where only ammonium bicarbonate, boric acid and a solvent such as glycerine, ethylene glycol or di-ethylene glycol are used, the use of borax or vegetable acids is not necessary. The use of borax, because of its rather high water content, is not desirable in electrolytes for condensers designed for high voltage use, but can be used with a degree of success in electrolytes for condensers designed for use on up to 250 volts. The higher the voltage, the less borax at its normal water content must be used.

It is to be remembered that the accurate control of the water content of the electrolyte is a very important factor in the production of high voltage condensers having low power factor and plenty of "snap", or high rate of discharge. By controlling the water content of the electrolyte and the proportions of the ingredients it is possible to accurately produce a condenser having predetermined qualities for a specified purpose. For instance, a condenser designed for use at 200 volts may have a greater per cent solvent in the electrolyte and higher water content than one designed for use at 500 volts.

I have found that excellent condensers may be made from an uncooked electrolyte, and in fact such condensers will have exceptionally good qualities as to capacity per square inch of surface, low power factor, and rate of discharge, however, such electrolytes for high voltage use are difficult to use in humid weather or where used in temperatures much above 100° F. Under such excessive conditions the electrolyte is apt to attack the plates of the condenser, especially the positive plate thereof.

Such a condenser will lack long life and will also have a tendency to unroll during the process of assembly. In order to produce an electrolyte retaining the good qualities of an uncooked electrolyte and yet have a consistency that will permit its easy application to the plates and separator and having sufficient stickiness to adhere readily to the plates and to retain its good qualities as a condenser over a period of years I have found that the electrolyte and condenser must be made substantially according to the following process and consisting of substantially the following ingredients: A stock chemical is first prepared by mixing bicarbonate of ammonia with boric acid in the proportion of about 1½ pounds ammounium bicarbonate to 6 pounds boric acid. This may be used immediately, but because of the evolution of gas and resultant effervescence when mixed with a solvent this is impractical in preparing large quantities and it is better to permit this stock chemical to stand twenty-four hours or more at atmospheric temperature, or until the ammonia of the bicarbonate has reacted with the boric acid and the $CO_2$ has been liberated. This reaction of the ammonia with the boric acid and the liberation of the $CO_2$ may be hastened by the application of heat, if desired.

The next step consists in adding about 12 pounds of a suitable solvent such as glycerine, ethylene glycol or di-ethylene glycol to about 7 pounds of the stock chemical above described. The temperature of this mixture is then gradually raised to the boiling point and kept there until a smooth syrup has been produced. If cooked too long, this syrup will be too sticky; if not cooked enough it will be too grainy, as the chemical will have a tendency to crystallize again. The proper cooking may be determined in several convenient ways. The specific gravity may be checked by means of a hydrometer, or the elements of temperature and time in cooking may be controlled. I have found through extensive tests that crystallization in the electrolyte is quite difficult to avoid, and is not at all a sign of quality in the paste. In fact, I have found that good condensers having desirable characteristics and long life can be made with an electrolyte entirely devoid of crystals. I have found that crystals in the electrolyte will not effect the capacity, reaction, or power factor to any appreciable extent. A grainy or crystalline condition of the paste of the electrolyte does, however, make it much more difficult to apply to the condenser plates or to the separator. To produce a smooth syrup the above approximate proportions of ingredients are maintained at a boiling temperature for about twenty-five to thirty-five minutes (for glycerine) depending upon the water content of all the ingredients, and upon the type of solvent used. The water content of an electrolyte is an important factor since an electrolyte having too high a percent of water will attack the plate especially if its temperature should rise much above 120° F. on a D. C. voltage much above 400 volts. The higher the temperature or the voltage, or both, the lower must be the water content.

When the mixture has been cooked to a smooth syrupy texture and has the desired specific gravity, it is cooled to 160° F. At this point, I mix about one ounce of bicarbonate of ammonia to 10 to 12 pounds of finely powdered boric acid and immediately and thoroughly mix these materials with the cooled syrup until a very smooth paste is obtained. An inert filler may also be added to this mixture of bicarbonate of ammonia, boric acid and syrup. I prefer to employ an inert filler such as asbestine, although finely powdered asbestos, silica or super floss may be used. I find that two or three pounds of this filler is a suitable proportion to mix with the foregoing amount of electrolyte. Of course, when the filler is used, it serves to displace either the ammonium bicarbonate, or boric acid, or both, but the use of such a filler is purely discretionary, since its purpose is to economize on the chemicals where the particular design of the condenser will permit. When a thinner paste than that produced by the above proportions of ingredients is desired, some of the boric acid may be eliminated.

It is to be understood that the process disclosed hereinbefore may be used in making other electrolytes including any of the materials named herein or any others which will produce satisfactory results. For instance, my improved process may be employed to produce an electrolyte where the stock chemical consists of or includes ammonium borate and a vegetable acid and/or borax, or aqua ammonia, boric acid and/or borax.

I claim:

1. A paste electrolyte for electrolytic condensers comprising ammonium bicarbonate, ammonium carbonate, boric acid and a solvent of the class consisting of glycerine, ethylene glycol or di-ethylene glycol.

2. The process of making a paste electrolyte for electrolytic condensers which includes mixing together at room temperature powdered ammonium bicarbonate and boric acid, allowing said mixture to react chemically for a predetermined period then dissolving said mixture in a solvent of the class consisting of glycerine, ethylene glycol and di-ethylene glycol to form an electrolyte of smooth pasty consistency.

3. The process of making a paste electrolyte for electrolytic condensers which includes mixing together at room temperature powdered ammonium bicarbonate and boric acid, allowing said mixture to react chemically for a predetermined period, and then dissolving said mixture in ethylene glycol.

4. The process of making a paste electrolyte for electrolytic condensers which includes mixing together at room temperature powdered ammonium bicarbonate and boric acid, allowing said mixture to react chemically for a predetermined period and then boiling said mixture in a solvent having low hygroscopicity such as ethylene glycol.

5. An electrolyte of paste consistency for use in electrolytic condensers which consists of an uncooked mixture of ammonium bicarbonate, boric acid, and a solvent of the class consisting of glycerine, ethylene glycol, and di-ethylene glycol.

6. The process of making a paste electrolyte for electrolytic condensers which includes mixing together at room temperature powdered ammonium bicarbonate and powdered boric acid, then mixing said mixture with a solvent having low hygroscopicity and of the class consisting of glycerine, ethylene glycol and di-ethylene glycol, boiling said solvent and mixture together until the mass reaches a predetermined specific gravity and finally mixing said mass thoroughly with a compound containing a relatively small amount of a carbonate of ammonia.

7. The process of making a paste electrolyte for electrolytic condensers which includes mixing together at room temperature powdered ammonium bicarbonate and powdered boric acid, then mixing said mixture with a solvent having low hygroscopicity and of the class consisting of glycerine, ethylene glycol and di-ethylene glycol, boiling said solvent and mixture together until the mass reaches a predetermined specific gravity and finally mixing said mass thoroughly with powdered boric acid.

8. The process of making a paste electrolyte for electrolytic condensers which includes mixing together at room temperature powdered ammonium bicarbonate and powdered boric acid, then mixing said mixture with a solvent having low hygroscopicity and of the class consisting of glycerine, ethylene glycol and di-ethylene glycol, boiling said solvent and mixture together until the mass reaches a predetermined specific gravity, and finally mixing said mass thoroughly with a compound containing approximately one ounce of ammonium bicarbonate and a relatively large proportion by weight of boric acid.

9. The process of making a paste electrolyte for electrolytic condensers which includes mixing together at room temperature powdered ammonium bicarbonate and powdered boric acid, then mixing said mixture with ethylene glycol, boiling said solvent and mixture together until the mass reaches a predetermined specific gravity, and finally mixing said mass thoroughly with a compound containing a carbonate of ammonia and boric acid.

10. The process of making a paste electrolyte for electrolytic condensers which includes mixing together at room temperature powdered ammonium bicarbonate and powdered boric acid, then mixing said mixture with a solvent having low hygroscopicity and of the class consisting of glycerine, ethylene glycol and di-ethylene glycol, boiling said solvent and mixture together until the mass reaches a predetermined specific gravity, and finally mixing said mass thoroughly with a compound containing a relatively small amount of ammonium bicarbonate and boric acid.

JESSE T. CURTIS.